United States Patent
Jindal et al.

(10) Patent No.: US 9,451,053 B1
(45) Date of Patent: Sep. 20, 2016

(54) SYSTEMS AND METHODS FOR INTERFACING SOFTWARE-DEFINED NETWORKS WITH NON-SOFTWARE-DEFINED NETWORKS

(71) Applicant: Juniper Networks, Inc., Sunnyvale, CA (US)

(72) Inventors: Apoorva Jindal, San Jose, CA (US); Rahul S. Kasralikar, San Jose, CA (US); Sandeep Bajaj, San Ramon, CA (US); Rahul Jain, Sunnyvale, CA (US)

(73) Assignee: Juniper Networks, Inc, Sunnyvale, CA (US)

( * ) Notice: Subject to any disclaimer, the term of this patent is extended or adjusted under 35 U.S.C. 154(b) by 140 days.

(21) Appl. No.: 14/231,493

(22) Filed: Mar. 31, 2014

(51) Int. Cl.
*H04L 29/06* (2006.01)
*H04L 12/911* (2013.01)
*H04L 12/723* (2013.01)
*H04L 12/46* (2006.01)

(52) U.S. Cl.
CPC .......... *H04L 69/08* (2013.01); *H04L 12/4633* (2013.01); *H04L 45/50* (2013.01); *H04L 47/825* (2013.01)

(58) Field of Classification Search
CPC . H04L 12/4633; H04L 69/08; H04L 47/825; H04L 45/50
See application file for complete search history.

(56) References Cited

U.S. PATENT DOCUMENTS

2011/0286324 A1* 11/2011 Bellagamba ........ H04L 41/0677
370/219

FOREIGN PATENT DOCUMENTS

WO    WO 2014143118 A1 *  9/2014 ........... H04L 12/462

OTHER PUBLICATIONS

Apoorva Jindal, et al; Systems and Methods for Increasing the Scalability of Software-Defined Networks; U.S. Appl. No. 13/936,033, filed Jul. 5, 2013.

* cited by examiner

*Primary Examiner* — Jackie Zuniga Abad
(74) *Attorney, Agent, or Firm* — ALG Intellectual Property, LLC

(57) ABSTRACT

A computer-implemented method for interfacing software-defined networks with non-software-defined networks may include (1) receiving at least one packet via software-defined network at a switching device, (2) searching a set of flow entries that collectively direct network traffic within the software-defined network for a flow entry that corresponds to the packet, (3) determining that the packet is destined for a non-software-defined network based at least in part on the search, and (4) forwarding the packet to the non-software-defined network via a logical tunnel that interfaces the software-defined network with the non-software-defined network by connecting a virtual port within the software-defined network to a virtual port within the non-software-defined network. Various other methods, systems, and computer-readable media are also disclosed.

20 Claims, 6 Drawing Sheets

```
                        Flow Entry
                           400
--------------------------------------------------------------
**********************************************

PRIORITY LEVEL:      3

MATCH CONDITIONS:

INGRESS PORT:        4
       VLAN ID:             6
            •                    •
            •                    •
            •                    •

ACTION:     Forward Data Packets to Virtual Port 118

STATISTICS:

RECEIVED PACKETS:    20000
       RECEIVED BYTES:      1500000
       DURATION:            47000000
            •                    •
            •                    •
            •                    •

```
                        Lookup Table
                            500
---------------------------------------------------------------
***************************************************************

VLAN ID      MAC ADDRESS          PORT 1            0014.1C40.B080       3
1            0100.0CCC.1CCC       5
4            0007.50C4.3440       1
6            000B.DB12.A3F9       2
8            0014.22E0.12B3       Virtual Port 120
    •              •                   •
    •              •                   •
    •              •                   •

SYSTEMS AND METHODS FOR INTERFACING SOFTWARE-DEFINED NETWORKS WITH NON-SOFTWARE-DEFINED NETWORKS

BACKGROUND

Software-defined networks (such as OPENFLOW networks) often include switches that direct network traffic from one computing device to another based on a set of flow entries managed by a remote controller. For example, a switch may receive a data packet from a device (such as a server or another switch) within an OPENFLOW network. Upon receiving the data packet, the switch may search a set of flow entries managed by a remote controller for a flow entry that indicates how to handle the data packet. During this search, the switch may identify a flow entry that applies to the data packet and determine how to handle the data packet based on the flow entry.

However, some traditional software-defined networks may have certain limitations and/or shortcomings when interfacing with non-software-defined networks (such as Multiprotocol Label Switching (MPLS) networks). For example, a switch may include some ports dedicated to an OPENFLOW network and other ports dedicated to an MPLS network. In this example, the switch may receive a data packet from a device within the OPEN FLOW network. This data packet may be destined for a device within the MPLS network. Unfortunately, the switch may be unable (or unaware of how) to handle this data packet without additional information about the identity and/or protocol of the MPLS network.

Additionally or alternatively, the switch may receive a data packet from a device within the MPLS network. This data packet may be destined for a device within the OPENFLOW network. Unfortunately, the remote controller that manages the set of flow entries may be unable to control the egress port through which this data packet enters the OPEN FLOW network from the MPLS network.

As such, the instant disclosure identifies and addresses a need for improved systems and methods for interfacing software-defined networks with non-software-defined networks.

SUMMARY

As will be described in greater detail below, the instant disclosure describes various systems and methods for interfacing software-defined networks with non-software-defined networks by creating a logical tunnel that connects a virtual port within a software-defined network to a virtual port within a non-software-defined network. In one example, a computer-implemented method for accomplishing such a task may include (1) receiving at least one packet at a switching device via a software-defined network, (2) searching a set of flow entries that collectively direct network traffic within the software-defined network for a flow entry that corresponds to the packet, (3) determining that the packet is destined for a non-software-defined network based at least in part on the search, and then (4) forwarding the packet to the non-software-defined network via a logical tunnel that interfaces the software-defined network with the non-software-defined network by connecting a virtual port within the software-defined network to a virtual port within the non-software-defined network.

Similarly, a system for implementing the above-described method may include (1) a receiving module that receives at least one packet at a switching device via a software-defined network, (2) a searching module that searches a set of flow entries that collectively direct network traffic within the software-defined network for a flow entry that corresponds to the packet, (3) a determination module that determines that the packet is destined for a non-software-defined network based at least in part on the search, (4) a forwarding module that forwards the packet to the non-software-defined network via a logical tunnel that interfaces the software-defined network with the non-software-defined network by connecting a virtual port within the software-defined network to a virtual port within the non-software-defined network, and (5) at least one processor configured to execute the receiving module, the searching module, the determination module, and the forwarding module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive at least one packet at a switching device via a software-defined network, (2) search a set of flow entries that collectively direct network traffic within the software-defined network for a flow entry that corresponds to the packet, (3) determine that the packet is destined for a non-software-defined network based at least in part on the search, and then (4) forward the packet to the non-software-defined network via a logical tunnel that interfaces the software-defined network with the non-software-defined network by connecting a virtual port within the software-defined network to a virtual port within the non-software-defined network.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is an illustration of an exemplary flow entry.

FIG. 5 is an illustration of an exemplary lookup table.

Figure 1:
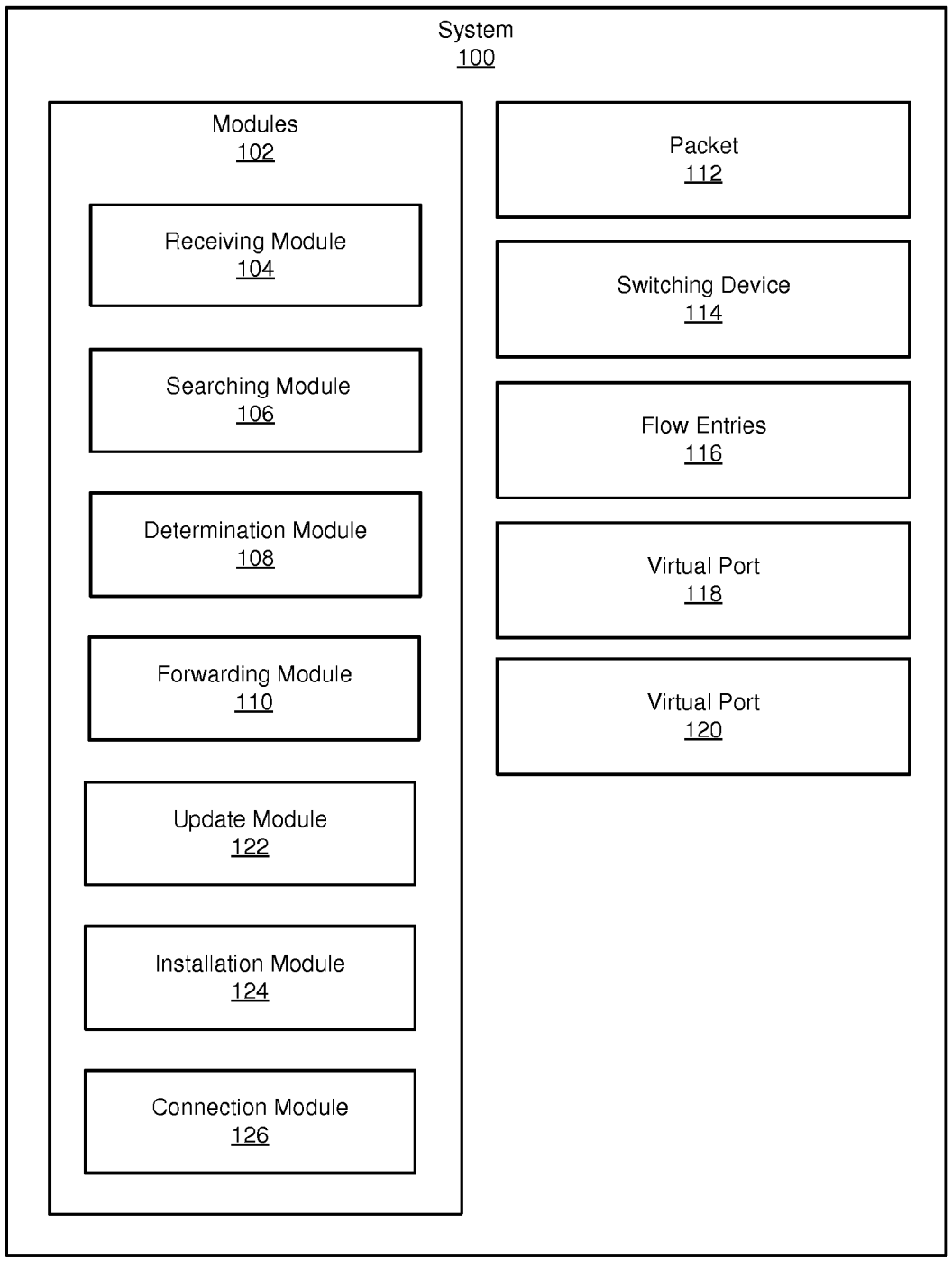
FIG. 1 is a block diagram of an exemplary system for interfacing software-defined networks with non-software-defined networks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for interfacing software-defined networks with non-software-defined networks. As will be explained in greater detail below, by creating a logical tunnel between a software-defined network and a non-software-defined network, the various systems and methods disclosed herein may efficiently and transparently route network traffic between the software-defined network and the non-software-defined network. For example, by creating such a logical tunnel, the disclosed systems and methods may enable a remote controller included in the software-defined network to control which egress port handles network traffic incoming from the non-software-defined network.

Additionally or alternatively, by creating such a logical tunnel, the disclosed systems and methods may enable the remote controller to direct network traffic from the software-defined network to the non-software-defined network without being aware of the identity and/or protocol of the non-software-defined network. Moreover, by creating such a logical tunnel, the disclosed systems and methods may enable the software-defined network to connect to any type or form of non-software-defined network.

Figure 2:
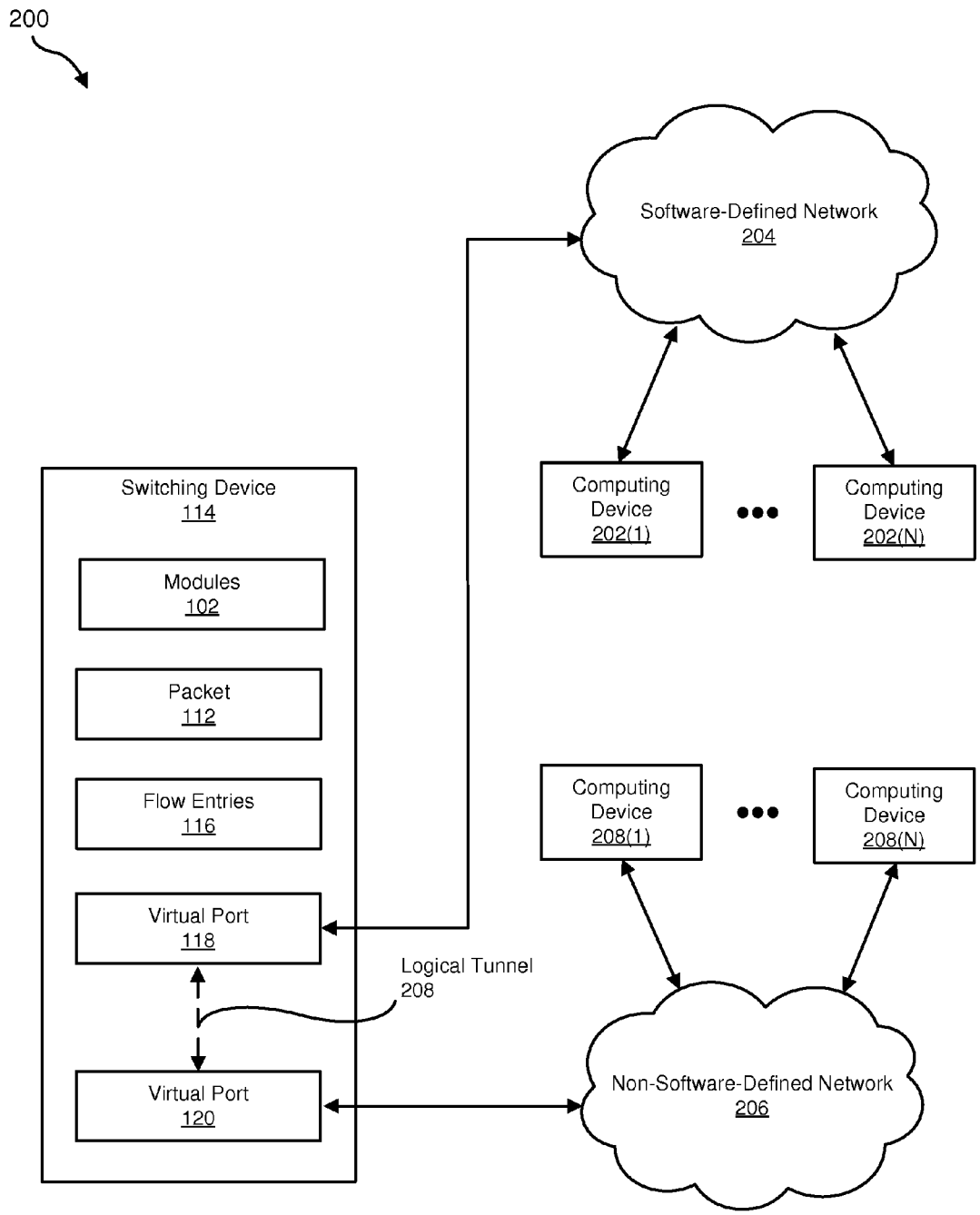
FIG. 2 is a block diagram of an additional exemplary system for interfacing software-defined networks with non-software-defined networks.

The following will provide, with reference to FIGS. 1-2, detailed descriptions of exemplary systems for interfacing software-defined networks with non-software-defined networks. Detailed descriptions of corresponding computer-implemented methods will be provided in connection with FIG. 3. Detailed descriptions of an exemplary flow entry will be provided in connection with FIG. 4. Detailed descriptions of an exemplary lookup table will be provided in connection with FIG. 5. In addition, detailed descriptions of an exemplary computing system capable of implementing one or more of the embodiments described herein will be provided in connection with FIG. 6.

FIG. 1 is a block diagram of an exemplary system 100 for interfacing software-defined networks with non-software-defined networks. As illustrated in this figure, exemplary system 100 may include one or more modules 102 for performing one or more tasks. For example, and as will be explained in greater detail below, exemplary system 100 may include a receiving module 104 that receives at least one packet at a switching device via a software-defined network. Exemplary system 100 may also include a searching module 106 that searches a set of flow entries that collectively direct network traffic within the software-defined network for a flow entry that corresponds to the packet.

In addition, and as will be described in greater detail below, exemplary system 100 may include a determination module 108 that determines that the packet is destined for a non-software-defined network based at least in part on the search. Furthermore, exemplary system 100 may include a forwarding module 110 that forwards the packet to the non-software-defined network via a logical tunnel that interfaces the software-defined network with the non-software-defined network by connecting a virtual port within the software-defined network to a virtual port within the non-software-defined network.

Additionally, exemplary system 100 may include an update module 122 that updates the set of flow entries that collectively direct network traffic within the software-defined network. Exemplary system 100 may also include an installation module 124 that installs a lookup table entry within a lookup table that directs network traffic within the non-software-defined network. Finally, exemplary system 100 may include a connection module 126 that connects the virtual port within the software-defined network to the virtual port within the non-software-defined network. Although illustrated as separate elements, one or more of modules 102 in FIG. 1 may represent portions of a single module or application (such as JUNIPER NETWORKS' JUNOS network operating system, CISCO SYSTEMS' INTERNETWORK OPERATING SYSTEM (IOS), OPEN VSWITCH, FLOWVISOR, SNAC, PICAS, INDIGO, PANTOU, OPENFAUCET, OPENFLOWJ, NETTLE, PDX, NOX, MUL, JAXON, FLOODLIGHT, RYU, NODEFLOW, ROUTEFLOW, and RESONANCE).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing devices 202(1)-(N), computing devices 208(1)-(N), and/or switching device 114), and/or computing system 610 in FIG. 6. One or more of modules 102 in FIG. 1 may also represent all or portions of one or more special-purpose computers configured to perform one or more tasks.

As illustrated in FIG. 1, exemplary system 100 may include one or more packets, such as packet 112. The term "packet" and the phrase "data packet," as used herein, generally refer to any type or form of package, encapsulation, abstraction, and/or object that includes one or more formatted units of data. In one example, packet 112 may represent a portion of encapsulated data included in network traffic that arrived at a switching device. Examples of packet 112 include, without limitation, OPENFLOW packets, MPLS packets, IP version 4 (IPv4) packets, IP version 6 (IPv6) packets, Gateway-to-Gateway Protocol (GGP) packets, Internet Group Message Protocol (IGMP) packets, Transmission Control Protocol (TCP) packets, combinations of one or more of the same, or any other suitable packet.

The phrase "network traffic," as used herein, generally refers to any type or form of data transfer occurring within a network and/or passing from one network to another. In one embodiment, packet 112 may originate from a software-defined network. In another embodiment, packet 112 may originate from a non-software-defined network. Additionally or alternatively, packet 112 may travel between a software-defined network and a non-software-defined network.

As illustrated in FIG. 1, exemplary system 100 may also include one or more switching devices, such as switching device 114. The phrase "switching device," as used herein generally refers to any type or form of device, apparatus, system, and/or application capable of routing and/or forwarding network traffic among devices of a software-defined network and/or a non-software-defined network. In one example, switching device 114 may be re-configured and/or re-programmed by a remote controller included in a software-defined network. Additionally or alternatively, switching device 114 may include one or more physical and/or virtual ports that facilitate communication within a software-defined network and/or a non-software-defined network. Examples of switching device 114 include, without limitation, network hubs, gateways, switches (such as OPENFLOW-enabled switches), bridges, routers, Field Programmable Gate Arrays (FPGAs), nodes, combinations of one or more of the same, or any other suitable switching device.

As illustrated in FIG. 1, exemplary system 100 may also include one or more flow entries, such as flow entries 116. The phrase "flow entry," as used herein, generally refers to any type or form of database entry that corresponds to a flow of data packets within a software-defined network. In one example, a flow entry within flow entries 116 may correspond to a data packet in the event that the flow entry and data packet have certain attributes in common. For example, a switch may encounter a data packet within a software-defined network. Upon encountering the data packet, the switch may iterate through flow entries 116 until identifying a flow entry whose attributes match attributes of the data packet.

Flow entries 116 may include a variety of data and/or information. In one example, flow entries 116 may include information that indicates how to handle data packets and/or statistics associated with such data packets. For example, a flow entry within flow entries 116 may include control logic that directs a switch to perform one or more actions on a data packet. Examples of such actions include, without limitation, forwarding a data packet to a specific device and/or along a specific network path, forwarding a data packet from and/or to a specific port, forwarding a data packet to another network (such as a non-software-defined network), encapsulating a data packet for transfer via a secure channel, enqueuing (or queuing) a data packet in a queue associated with a specific port, dropping a data packet, combinations of one or more of the same, or any other suitable actions.

Additionally or alternatively, a flow entry within flow entries 116 may include statistics that identify how many data packets received by the switch have matched the flow entry. Examples of such statistics include, without limitation, the number of data packets that have matched a flow entry, the number of bytes included in data packets that have matched a flow entry, the duration of time that a flow entry has been stored in a database or switch, combinations of one or more of the same, or any other suitable statistics associated with a flow entry.

As illustrated in FIG. 1, exemplary system 100 may also include one or more virtual ports, such as virtual ports 118 and 120. The phrase "virtual port," as used herein, generally refers to any type or form of virtual and/or logical interface that facilitates data transfer within a network and/or between networks. In one example, virtual ports 118 and 120 may collectively form a logical tunnel that interfaces a software-defined network with a non-software-defined network. In this example, virtual port 118 may include a Layer 2 interface within the software-defined network. Additionally or alternatively, virtual port 120 may include a Layer 2 interface, an IPv4 interface, an IPv6 interface, a Circuit Cross-Connect (CCC) interface, and/or an MPLS interface within the non-software-defined network.

Examples of virtual ports 118 and 120 include, without limitation, virtual ports, logical ports, virtual interfaces, logical interfaces, Virtual Local Area Networks (VLANs), Layer 2 interfaces, IPv4 interfaces, IPv6 interfaces, CCC interfaces, MPLS interfaces, portions of one or more of the same, combinations of one or more of the same, or any other suitable virtual ports.

Exemplary system 100 in FIG. 1 may be implemented in a variety of ways. For example, all or a portion of exemplary system 100 may represent portions of exemplary system 200 in FIG. 2. As shown in FIG. 2, system 200 may include switching device 114 in communication with computing devices 202(1)-(N) via a software-defined network 204 and/or computing devices 208(1)-(N) via a non-software-defined network 206. Although illustrated as a separate element in FIG. 2, switching device 114 may represent a portion of software-defined network 204 and/or a portion of non-software-defined network 206.

The phrase "software-defined network," as used herein, generally refers to any type or form of network that separates and/or decouples the network's control plane and data plane across multiple network devices. The term "control plane," as used herein, generally refers to any type or form of switching architecture that determines and/or decides how to handle certain network traffic encountered within a network. In contrast, the term "data plane," as used herein, generally refers to any type or form of switching architecture that handles certain network traffic as directed by a control plane within a network.

In one example, software-defined network 204 may implement an OPENFLOW communications protocol that facilitates access to flow entries 116 stored on switching device 114. Additionally or alternatively, software-defined network 204 may include a remote and/or centralized controller (not illustrated in FIG. 2) capable of configuring and/or programing switching device 114. For example, a remote controller may install and/or modify flow entries 116 that indicate how to handle certain network traffic encountered at switching device 114. By installing and/or modifying flow entries 116, the remote controller may control and/or direct network traffic encountered at switching device 114.

The phrase "non-software-defined network," as used herein, generally refers to any type or form of network whose network devices each encompass, provide, and/or include both control and data planes. In one example, non-software-defined network 206 may implement a traditional communication protocol that controls certain network traffic at switching device 114. Examples of such traditional communication protocols include, without limitation, Layer 2 protocols, Layer 3 protocols, IPv4 protocols, IPv6 protocols, MPLS protocols, combinations of one or more of the same, or any other suitable non-software-defined protocol.

In some examples, switching device 114 may be programmed with one or more of modules 102. Additionally or alternatively, switching device 114 may include packet 112, flow entries 116, and/or virtual ports 118 and 120.

As illustrated in FIG. 2, virtual ports 118 and 120 may collectively form a logical tunnel 208 that interfaces software-defined network 204 with non-software-defined network 206. The phrase "logical tunnel," as used herein, generally refers to any type or form of virtual and/or logical tunnel, interface, tool, and/or portal that connects a software-defined network with a non-software-defined network. In one example, logical tunnel 208 may enable switching device 114 to pass network traffic from software-defined network 204 to non-software-defined network 206. Additionally or alternatively, logical tunnel 208 may enable switching device 114 to pass network traffic from non-software-defined network 206 to software-defined network 204.

In one embodiment, one or more of modules 102 from FIG. 1 may, when executed by at least one processor of switching device 114, enable switching device 114 to interface software-defined network 204 with non-software-defined network 206. For example, and as will be described in greater detail below, receiving module 104 may cause switching device 114 to receive packet 112 via software-defined network 204. Searching module 106 may then cause switching device 114 to search flow entries 116 that collectively direct network traffic within software-defined network 204 for a flow entry that corresponds to packet 112. Next, determination module 108 may cause switching device 114 to determine that packet 112 is destined for non-software-defined network 206 based at least in part on this search. Finally, forwarding module 110 may cause switching device 114 to forward packet 112 to non-software-defined network 206 via logical tunnel 208 that interfaces software-defined network 204 with non-software-defined network 206 by connecting virtual port 118 within software-defined network 204 with virtual port 120 within non-software-defined network 206.

Computing devices 202(1)-(N) and 208(1)-(N) generally represent any type or form of computing device capable of reading computer-executable instructions. Examples of computing devices 202(1)-(N) and 208(1)-(N) include, without limitation, laptops, tablets, desktops, servers, cellular phones, network hubs, gateways, switches, bridges, routers, FPGAs, nodes, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing devices.

Software-defined network 204 may include any type or form of medium and/or architecture capable of facilitating communication and/or data transfer. Examples of such a medium and/or architecture include, without limitation, an intranet, a Wide Area Network (WAN), a Local Area Network (LAN), a Virtual LAN (VLAN), a Personal Area Network (PAN), the Internet, a Power Line Communications (PLC) network, a cellular network (e.g., a Global System for Mobile Communications (GSM) network), portions of one or more of the same, combinations of one or more of the same, or any other suitable medium and/or architecture. Software-defined network 204 may facilitate communication or data transfer using wireless or wired connections. In one embodiment, software-defined network 204 may facilitate communication between switching device 114 and computing devices 202(1)-(N).

Non-software-defined network 206 may include any type or form of medium and/or architecture capable of facilitating communication and/or data transfer. Examples of such a medium and/or architecture include, without limitation, an intranet, a WAN, a LAN, a VLAN, a PAN, the Internet, a PLC network, a cellular network, portions of one or more of the same, combinations of one or more of the same, or any other suitable medium and/or architecture. Non-software-defined network 206 may facilitate communication or data transfer using wireless or wired connections. In one embodiment, non-software-defined network 206 may facilitate communication between switching device 114 and computing devices 208(1)-(N).

Figure 3:
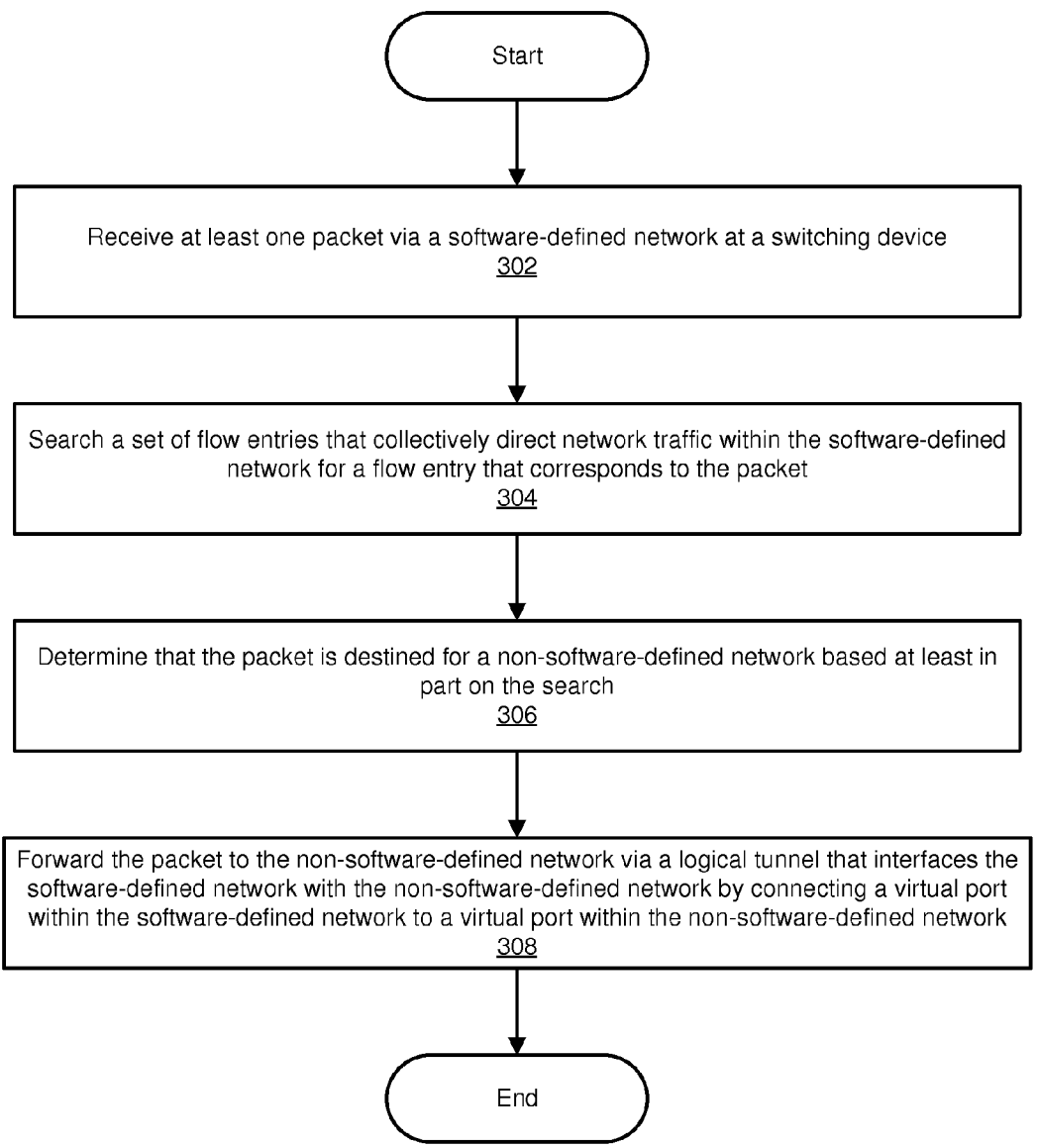
FIG. 3 is a flow diagram of an exemplary method for interfacing software-defined networks with non-software-defined networks.

FIG. 3 is a flow diagram of an exemplary computer-implemented method 300 for interfacing software-defined networks with non-software-defined networks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, and/or computing system 610 in FIG. 6.

As illustrated in FIG. 3, at step 302 one or more of the systems described herein may receive, at a switching device, at least one packet via a software-defined network. For example, receiving module 104 may, as part of switching device 114 in FIG. 2, receive packet 112 via software-defined network 204. In this example, packet 112 may arrive at switching device 114 via a physical or virtual port dedicated to software-defined network 204.

The systems described herein may perform step 302 in a variety of ways. In some examples, receiving module 104 may receive packet 112 via any type or form of port on switching device 114. For example, receiving module 104 may receive packet 112 via a physical port dedicated to software-defined network 204 on switching device 114. Additionally or alternatively, receiving module 104 may receive packet 112 via a virtual port dedicated to software-defined network 204 on switching device 114.

In some examples, receiving module 104 may receive packet 112 from any computing device within software-defined network 204. For example, computing device 202(1) may forward packet 112 to switching device 114 via software-defined network 204. Additionally or alternatively, computing device 202(N) may forward packet 112 to switching device 114 via software-defined network 204. As packet 112 arrives at switching device 114, receiving module 104 may detect and/or receive packet 112.

In some examples, receiving module 104 may receive packet 112 from any computing device outside software-defined network 204. For example, a computing device outside software-defined network 204 may generate packet 112 and forward the same to computing device 202(1) within software-defined network 204. Computing device 202(1) may then forward packet 112 to switching device 114 via software-defined network 204. As packet 112 arrives at switching device 114, receiving module 104 may detect and/or receive packet 112.

In some examples, switching device 114 may host and/or support multiple networks. For example, switching device 114 may include portions of both software-defined network 204 and non-software-defined network 206. Switching device 114 may also include portions of one or more additional networks (not illustrated in FIG. 2).

In some examples, switching device 114 may include various ports assigned to different networks. For example, switching device 114 may include 100 ports. In this example, 25 of these 100 ports may be assigned to software-defined network 204. Another 25 of these 100 ports may be assigned to non-software-defined network 206. Additionally or alternatively, the remaining 50 ports may be assigned to an additional software-defined network and/or an additional non-software-defined network. As will be discussed in greater detail below, one or more of modules 102 may, as part of switching device 114, facilitate the transfer of packets between such networks hosted and/or supported by switching device 114.

Returning to FIG. 3, at step 304 one or more of the systems described herein may search a set of flow entries that collectively direct network traffic within the software-defined network for a flow entry that corresponds to the packet. For example, searching module 106 may, as part of switching device 114 in FIG. 2, search flow entries 116 for a flow entry that corresponds to packet 112. In this example, flow entries 116 may collectively direct network traffic within software-defined network 204.

The systems described herein may perform step 304 in a variety of ways. In some examples, searching module 106 may search flow entries 116 for a flow entry that indicates how to handle packet 112. For example, searching module 106 may iterate through flow entries 116 in order to identify a flow entry whose match conditions match attributes of packet 112. The phrase "match condition," as used herein, generally refers to any type or form of characteristic, attribute, condition, and/or header information that corresponds to and/or describes a flow of data packets within a software-defined network. Examples of such match conditions include, without limitation, ingress (or incoming) ports, egress (or outgoing) ports, Ethernet source addresses, Ethernet destination addresses, Ethernet types, VLAN identifiers, VLAN priority levels, IP source addresses, IP destination addresses, IP protocols, IP Type of Service (ToS) bits, transport source ports, Internet Control Message Protocol (ICMP) types, transport destination ports, ICMP codes, combinations of one or more of the same, or any other suitable match conditions.

In some examples, searching module 106 may iterate through flow entries 116 according to a priority level of each of flow entries 116. For example, the priority level of each flow entry within flow entries 116 may depend on the number of valid match conditions and/or wildcards of each flow entry. The phrase "valid match condition," as used herein, generally refers to any type or form of match condition of a flow entry that is used to determine whether a data packet or request matches the flow entry. In addition, the phrase "wildcard," as used herein, generally refers to any type or form of match condition of a flow entry that is not used to determine whether a data packet or request matches the flow entry.

In one example, as the number of valid match conditions decreases (and, in turn, the number of wildcards increases), the priority level may decrease. For example, in the event that the total number of match conditions is 14, each flow entry within flow entries 116 that includes 14 valid match conditions and 0 wildcards may have the highest priority level. In addition, each flow entry within flow entries 116 that includes the same 12 valid match conditions and the same 2 wildcards may have the same lower priority level as one another. Accordingly, various flow entries within flow entries 116 may have the same priority level as one another.

In some examples, while iterating through flow entries 116 in order to identify the flow entry that corresponds to packet 112, searching module 106 may identify the highest-priority flow entry that corresponds to and/or applies to packet 112. For example, searching module 106 may identify each valid match condition of a flow entry within flow entries 116 and then compare one or more attributes of packet 112 with each valid match condition of the flow entry. In this example, searching module 106 may determine that the attributes of packet 112 match each valid match condition of the flow entry. Searching module 106 may then determine that the flow entry corresponds and/or applies to packet 112 since the attributes of packet 112 match each valid match condition of the flow entry.

FIG. 4 is an illustration of exemplary flow entry 400. As illustrated in FIG. 4, flow entry 400 may include information that identifies the priority level of the flow of packets (in this example, "3"), the attributes of the flow of packets (in this example, "INGRESS PORT" and "VLAN ID"), the values of the attributes of the flow of packets (in this example, "4" and "6"), an action to perform on matching packets (in this example, "Forward Packets to Virtual Port 118"), and associated statistics (in this example, "RECEIVED PACKETS: 20000," "RECEIVED BYTES: 1500000," and "DURATION: 47000000").

In some examples, searching module 106 may determine that packet 112 corresponds to flow entry 400 based at least in part on the attributes of packet 112 matching each valid match condition of flow entry 400. For example, searching module 106 may identify the ingress port of packet 112 as "4" and the VLAN ID of packet 112 as "6". In this example, searching module 106 may determine that flow entry 400 corresponds to packet 112 based at least in part on the attributes of packet 112 matching the corresponding match conditions of flow entry 400.

In some examples, one or more of the systems described herein may update flow entries 116 by adding flow entry 400. For example, receiving module 104 may detect and/or receive a packet at switching device 114 via software-defined network 204. Upon reception of this packet, searching module 106 may search flow entries 116 for a flow entry that indicates how to handle this packet.

In the event that this is the first time that switching device 114 has encountered the packet, flow entries 116 may not yet include a flow entry that corresponds and/or applies to the packet. As a result, search module 106 may iterate through flow entries 116 without finding a flow entry whose match conditions match the corresponding attributes of the packet. In response to this failed attempt to find a flow entry that indicates how to handle the packet, update module 122 may, as part of switching device 114, direct switching device 114 to transfer the packet to a remote controller (not illustrated in FIG. 2) within software-defined network 204.

Upon receiving the packet from switching device 114, the remote controller may analyze the contents of the packet and determine how switching device 114 is to handle the data packet (both now and in future encounters) based at least in part on this analysis. The remote controller may then issue a request to switching device 114 to add flow entry 400 to flow entries 116. Upon reception of this request at switching device 114, update module 122 may add flow entry 400 to flow entries 116 based at least in part on the request.

Returning to FIG. 3, at step 306 one or more of the systems described herein may determine that the packet is destined for a non-software-defined network based at least in part on the search. For example, determination module 108 may, as part of switching device 114 in FIG. 2, determine that packet 112 is destined for non-software-defined network 206 based at least in part of the search. In this example, the determined destination may represent a final destination of packet 112 within non-software-defined network 204. Additionally or alternatively, the determined destination may represent an intermediate gateway (e.g., the next hop) of packet 112 on the way to its final destination.

The systems described herein may perform step 306 in a variety of ways. In some examples, determination module 108 may determine that the flow entry corresponding to packet 112 indicates that packet 112 is destined for non-software-defined network 206. For example, determination module 108 may analyze flow entry 400 in FIG. 4 that corresponds to packet 112. During this analysis, determination module 108 may determine that packet 112 is heading to virtual port 118 based at least in part on the action field included in flow entry 400. Determination module 108 may then assume and/or infer that packet 112 is destined for non-software-defined network 206 since virtual port 118 leads to non-software-defined network 206 via logical tunnel 208.

Returning to FIG. 3, at step 308 one or more of the systems described herein may forward the packet to the non-software-defined network via a logical tunnel that interfaces the software-defined network with the non-softwaredefined network by connecting a virtual port within the software-defined network to a virtual port within the non-software-defined network. For example, forwarding module 110 may, as part of switching device 114 in FIG. 2, forward packet 112 to non-software-defined network 206 via logical tunnel 208 that interfaces software-defined network 204 with non-software-defined network 206 by connecting virtual port 118 to virtual port 120. In this example, virtual port 118 may be assigned to and/or represent a portion of software-defined network 204. Additionally or alternatively, virtual port 120 may be assigned to and/or represent a portion of non-software-defined network 206.

The systems described herein may perform step 308 in a variety of ways. In some examples, forwarding module 110 may use logical tunnel 208 to pass packet 112 from software-defined network 204 to non-software-defined network 206. For example, forwarding module 110 may deliver packet 112 to virtual port 118 within software-defined network 204. Upon receiving packet 112, virtual port 118 may channel packet 112 to virtual port 120 within non-software-defined network 206 via logical tunnel 208.

In some examples, connection module 126 may create logical tunnel 208 to facilitate interfacing software-defined network 204 with non-software-defined network 206. For example, connection module 126 may create virtual port 118 within software-defined network 204 and virtual port 120 within non-software-defined network 206. Connection module 126 may then link virtual port 118 with virtual port 120 via logical tunnel 208.

In some examples, connection module 126 may define logical tunnel 208 such that all network traffic that ingresses into virtual port 118 egresses out of virtual port 120. Accordingly, logical tunnel 208 may enable any network traffic that enters virtual port 118 within software-defined network 204 to exit virtual port 120 within non-software-defined network 206.

Additionally or alternatively, connection module 126 may define logical tunnel 208 such that all network traffic that ingresses into virtual port 120 egresses out of virtual port 118. Accordingly, logical tunnel 208 may enable any network traffic that enters virtual port 120 within non-software-defined network 206 to exit virtual port 118 within software-defined network 204.

Once packet 112 has entered virtual port 118 and exited virtual port 120, one or more of modules 102 may route packet 112 to its next hop and/or final destination within non-software-defined network 206. In one example, receiving module 104 may receive packet 112 at non-software-defined network 206 via logical tunnel 208. For example, packet 112 may exit virtual port 120 into non-software-defined network 206. As packet 112 exits virtual port 120 into non-software-defined network 206, receiving module 104 may detect and/or receive packet 112.

Upon reception of packet 112 at non-software-defined network 206, searching module 106 may search a lookup table that directs network traffic within non-software-defined network 206 for a lookup table entry that corresponds to packet 112. The phrase "lookup table," as used herein, generally refers to any type or form of data structure and/or array that specifies and/or identifies hops, destinations, and/or routes within a non-software-defined network. For example, searching module 106 may search lookup table 500 in FIG. 5 for a lookup table entry that corresponds to packet 112. As illustrated in FIG. 5, lookup table 500 may include a list of VLAN IDs (in this example, "1," "1," "4," "6," "8," and so on), a list of Media Access Control (MAC) addresses (in this example, "0014.1c40.B080," "0010.0CCC.1CCC," "0007.50C4.3440," "000B.DB12.A3F9," "0014.22E0.12B3," and so on), and a list of corresponding ports ("in this example, "3," "5," "1," "2," "Virtual Port 120," and so on). Lookup table 500 may also include various other information not illustrated in FIG. 5.

In some examples, searching module 106 may locate the lookup table entry that corresponds to packet 112 by determining that one or more attributes of packet 112 match the lookup table entry. For example, searching module 106 may identify a destination MAC address within packet 112. Upon identifying this destination MAC address, searching module 106 may iterate through the entries within lookup table 500 to locate the corresponding entry. While iterating through the entries within lookup table 500, searching module 106 may identify an entry that corresponds to the destination MAC address identified within packet 112.

Upon identification of the corresponding lookup table entry, determination module 108 may analyze the lookup table entry. During this analysis, determination module 108 may determine that packet 112 is heading to a specific port based at least in part on the lookup table entry. For example, the lookup table entry may indicate that packet 112 is heading to a port that corresponds to computing device 208(1) within non-software-defined network 206. In this example, determination module 108 may assume and/or infer that packet 112 is destined for computing device 208(1) since the port identified within the lookup table entry corresponds to computing device 208(1).

As a specific example, searching module 106 may identify "000B.DB12.A3F9" as the destination MAC address of packet 112. Upon identifying the "000B.DB12.A3F9" destination MAC address, searching module 106 may search lookup table 500 for an entry that corresponds to the "000B.DB12.A3F9" MAC address. During this search, searching module 106 may identify an entry indicating that any packet that includes the "000B.DB12.A3F9" destination MAC address is forwarded to port 2. Forwarding module 110 may then forward packet 112 to port 2 based at least in part on the entry identified within lookup table 500.

In some examples, one or more of the systems described herein may install lookup table 500 within non-software-defined network 206. For example, installation module 124 may, as part of switching device 114, install lookup table 500 within non-software-defined network 206 during the creation of logical tunnel 208. By installing lookup table 500 in this way, installation module 124 may ensure that any packet that exits virtual port 120 is routed to the next hop and/or final destination based at least in part on lookup table 500.

Additionally or alternatively, installation module 124 may update lookup table 500 to account for changes occurring within non-software-defined network 206. For example, installation module 124 may add new entries to lookup table 500. In another example, installation module 124 may modify existing entries in lookup table 500. Installation module 124 may also delete obsolete entries from lookup table 500.

The systems described herein are not limited to passing network traffic from software-defined network 204 to non-software-defined network 206. In some examples, one or more of the systems described herein may facilitate passing network traffic from non-software-defined network 206 to software-defined network 204. For example, receiving module 104 may receive at least one additional packet via non-software-defined network 206.

In one example, receiving module 104 may receive the additional packet via any type or form of port on switching device 114. For example, receiving module 104 may receive the additional packet via a physical port dedicated to non-software-defined network 206 on switching device 114. Additionally or alternatively, receiving module 104 may receive the additional packet via a virtual port dedicated to non-software-defined network 206 on switching device 114.

In one example, receiving module 104 may receive the additional packet from any computing device within non-software-defined network 206. For example, computing device 208(1) may forward the additional packet to switching device 114 via non-software-defined network 206. Additionally or alternatively, computing device 208(N) may forward the additional packet to switching device 114 via non-software-defined network 206. As the additional packet arrives at switching device 114, receiving module 104 may detect and/or receive the additional packet.

In some examples, one or more of the systems described herein may search lookup table 500 for a lookup table entry that corresponds to the additional packet. For example, searching module 106 may search lookup table 500 for a lookup table entry that indicates how to handle the additional packet. In this example, searching module 106 may identify a destination MAC address within the additional packet. Upon identifying this destination MAC address, searching module 106 may iterate through the entries within lookup table 500 to locate the corresponding entry. While iterating through the entries within lookup table 500, searching module 106 may identify an entry that corresponds to the destination MAC address identified within the additional packet.

Upon identification of the corresponding lookup table entry, determination module 108 may analyze the lookup table entry. During this analysis, determination module 108 may determine that the additional packet is heading to a specific port based at least in part on the lookup table entry. For example, the lookup table entry may indicate that the additional packet is heading to virtual port 120 within non-software-defined network 206. In this example, determination module 108 may assume and/or infer that the additional packet is destined for a computing device within software-defined network 204 since virtual port 120 identified within the lookup table entry leads to logical tunnel 208.

As a specific example, searching module 106 may identify "0014.22E0.12B3" as the destination MAC address of packet 112. Upon identifying the "0014.22E0.12B3" destination MAC address, searching module 106 may search lookup table 500 for an entry that corresponds to the "0014.22E0.12B3" MAC address. During this search, searching module 106 may identify an entry indicating that any packet that includes the "0014.22E0.12B3" destination MAC address is forwarded to virtual port 120. Forwarding module 110 may then forward the additional packet to virtual port 120 based at least in part on the entry identified within lookup table 500.

Once the additional packet has entered virtual port 120 and exited virtual port 118, one or more of modules 102 may route the additional packet to its next hop and/or final destination within software-defined network 204. In one example, receiving module 104 may receive the additional packet at software-defined network 204 via logical tunnel 208. For example, the additional packet may exit virtual port 118 into software-defined network 204. As the additional packet exits virtual port 118 into software-defined network 204, receiving module 104 may detect and/or receive the additional packet.

Upon reception of the additional packet at software-defined network 204, searching module 106 may search flow entries 116 for a flow entry that corresponds to the additional packet. Searching module 106 may perform this search of flow entries 116 in any of the ways described above in connection with step 304. During this search, searching module 106 may identify a flow entry that corresponds to the additional packet.

Upon identification of the corresponding flow entry, determination module 108 may analyze the flow entry. During this analysis, determination module 108 may determine that the additional packet is heading to a port that corresponds to computing device 202(N) based at least in part on the action field included in the flow entry. Determination module 108 may then assume and/or infer that the additional packet is destined for computing device 202(N) since the port identified within the action field corresponds to computing device 202(N).

In one embodiment, receiving module 104 may receive, at switching device 114, at least one additional packet via software-defined network 204. In response to the additional packet, searching module 106 may search flow entries 116 for an additional flow entry that corresponds to the additional packet. Determination module 108 may then determine, based at least in part on the search, that the additional packet is destined for an additional non-software-defined network (not illustrated in FIG. 2). Next, forwarding module 110 may forward the additional packet to the additional non-software-define network via an additional logical tunnel that interfaces software-defined network 204 with the additional non-software-defined network by connecting an additional virtual port within software-defined network 204 to an additional virtual port within the additional non-software-defined network.

As explained above, by creating a logical tunnel between an OPENFLOW network and a traditional network (such as an MPLS network), a switching device may efficiently and transparently route network traffic between the OPENFLOW network and the traditional network. For example, the switching device may receive a packet at a port within the OPENFLOW network. The switching device may then determine that the packet is destined for a computing device within an MPLS network. In response to this determination, the switching device may forward the packet to the MPLS network via the logical tunnel. Once the packet arrives at the MPLS network, the switching device may forward the packet to a specific destination port within the MPLS network.

Additionally or alternatively, the switching device may utilize the logical tunnel to forward packets from the MPLS network to the OPENFLOW network. For example, the switching device may receive a packet at a port within the MPLS network. The switching device may then determine that the packet is destined for a computing device within the OPENFLOW network. In response to this determination, the switching device may forward the packet to the OPENFLOW network via the logical tunnel. Once the packet arrives at the OPENFLOW network, the switching device may forward the packet to a specific destination port within the OPENFLOW network.

Figure 6:
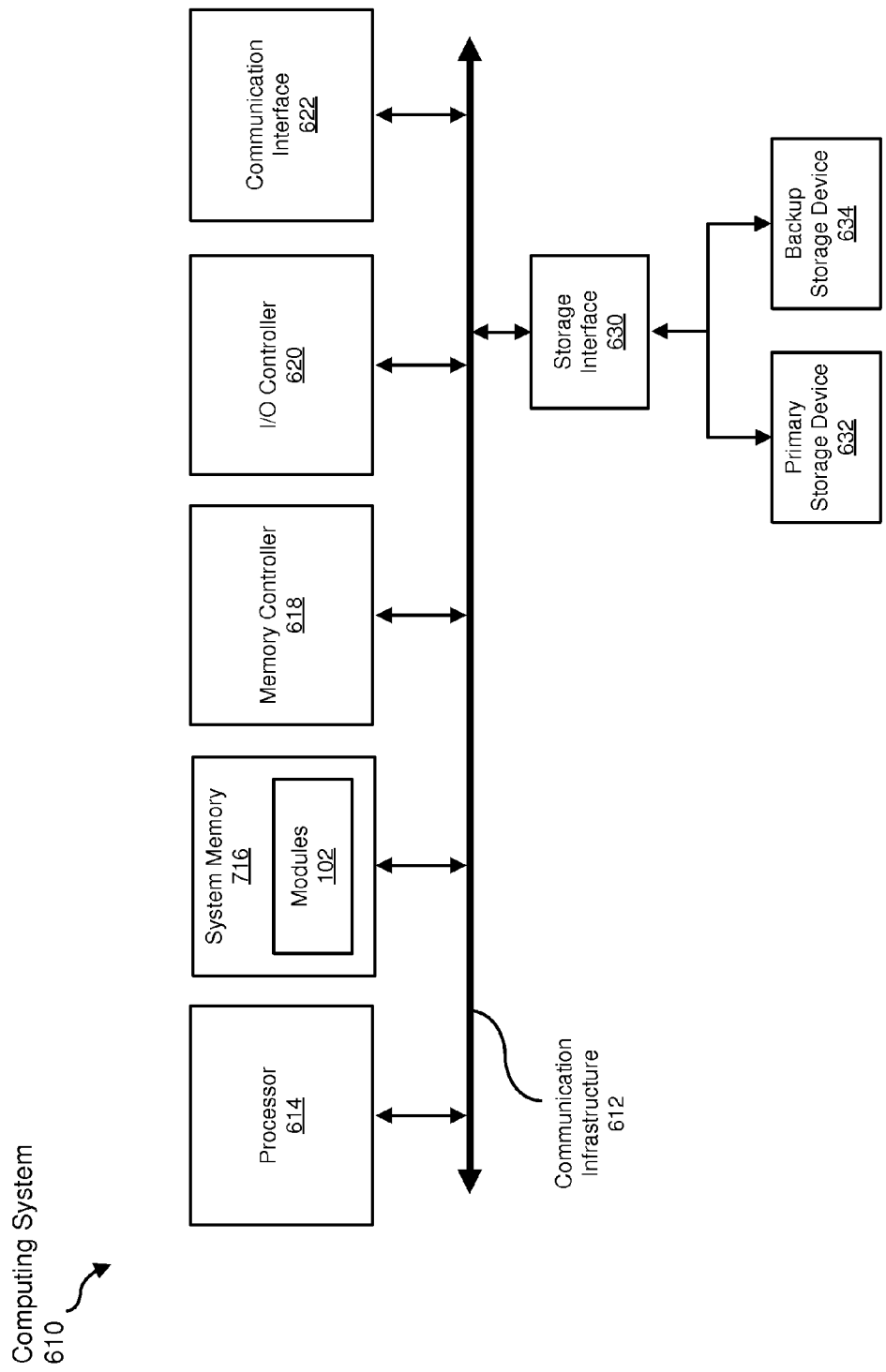
FIG. 6 is a block diagram of an exemplary computing system capable of implementing and/or being used in connection with one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly type or form of electrical load, including a single or multi-processor computing device or system capable of executing computer-readable instructions. Examples of computing system 610 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 610 may be programmed, configured, and/or otherwise designed to comply with one or more networking protocols. According to certain embodiments, computing system 600 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 610 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Processor 614 may process data according to one or more of the networking protocols discussed above. For example, processor 614 may execute or implement a portion of a protocol stack, may process packets, may perform memory operations (e.g., queuing packets for later processing), may execute end-user applications, and/or may perform any other processing tasks.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). System memory 616 may be implemented as shared memory and/or distributed memory in a network device. Furthermore, system memory 616 may store packets and/or other information used in networking operations.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as such as a Serial ATA (SATA), an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In some embodiments, memory controller 618 may include a Direct Memory Access (DMA) unit that may transfer data (e.g., packets) to or from a link adapter.

I/O controller 620 generally represents any type or form of device or module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a link adapter, a wired network interface (such as a network interface card), a wireless network interface (such as a wireless network interface card), and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also enable computing system 600 to engage in distributed or remote computing. For example, communication interface 622 may receive instructions from a remote device or send instructions to a remote device for execution.

As illustrated in FIG. 6, exemplary computing system 600 may also include a primary storage device 632 and/or a backup storage device 634 coupled to communication infrastructure 612 via a storage interface 630. Storage devices 632 and 634 generally represent any type or form of storage device or medium capable of storing data and/or other computer-readable instructions. For example, storage devices 632 and 634 may represent a magnetic disk drive (e.g., a so-called hard drive), a solid state drive, a floppy disk drive, a magnetic tape drive, an optical disk drive, a flash drive, or the like. Storage interface 630 generally represents any type or form of interface or device for transferring data between storage devices 632 and 634 and other components of computing system 600.

In certain embodiments, storage devices 632 and 634 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 634 may also include other similar structures or devices for allowing computer software, data, or other computer-readable instructions to be loaded into computing system 610. For example, storage devices 632 and 634 may be configured to read and write software, data, or other computer-readable information. Storage devices 632 and 634 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from those shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for interfacing software-defined networks with non-software-defined networks, at least a portion of the method being performed by a computing device comprising at least one processor, the method comprising:

creating, at a switching device, a logical tunnel that interfaces a software-defined network with a non-software-defined network by connecting a Layer 2 interface of the switching device within the software-defined network to a Circuit Cross-Connect (CCC) interface of the switching device within the non-software-defined network, the logical tunnel being defined such that:

all network traffic that ingresses into the Layer 2 interface within the software-defined network egresses out of the CCC interface within the non-software-defined network;

all network traffic that ingresses into the CCC interface within the non-software-defined network egresses out of the Layer 2 interface within the software-defined network;

a remote controller of the software-defined network is able to control which Layer 2 interface handles network traffic incoming from the non-software-defined network by installing, on the Layer 2 interface, a set of flow entries that collectively direct network traffic incoming from the CCC interface;

the remote controller of the software-defined network is able to direct network traffic from the software-defined network to the non-software-defined network without being aware of the non-software-defined network's identity or communication protocol by relying on a lookup table installed on the CCC interface for routing network traffic within the non-software-defined network;

receiving, at the switching device, at least one packet via the software-defined network;

searching the set of flow entries that collectively direct network traffic within the software-defined network for a flow entry that corresponds to the packet;

determining, based at least in part on the search, that the packet is destined for the non-software-defined network; and forwarding the packet to the non-software-defined network via the logical tunnel that interfaces the software-defined network with the non-software-defined network by directing the packet to the Layer 2 interface within the software-defined network such that the packet egresses out of the CCC interface within the non-software-defined network.

2. The method of claim 1, wherein determining that the packet is destined for the non-software-defined network comprises determining that an action field within the flow entry directs the packet to the logical tunnel.

3. The method of claim 1, wherein forwarding the packet to the non-software-defined network via the logical tunnel comprises routing the packet to the Layer 2 interface within the software-defined network such that the packet exits the CCC interface within the non-software-defined network.

4. The method of claim 1, further comprising, prior to searching the set of flow entries that collectively direct network traffic within the software-defined network, updating the set of flow entries by adding the flow entry to the set of flow entries.

5. The method of claim 1, wherein the flow entry directs corresponding network traffic to the Layer 2 interface within the software-defined network to facilitate passing the corresponding network traffic to the CCC interface within the non-software-defined network via the logical tunnel.

6. The method of claim 1, further comprising:

receiving, at the non-software-defined network, the packet via the logical tunnel;

searching the lookup table installed on the CCC interface for a lookup table entry that corresponds to the packet;

determining, based at least in part on the search, that the packet is destined for a computing device within the non-software-defined network; and forwarding the packet to the computing device within the software-defined network.

7. The method of claim 6, further comprising, prior to searching the lookup table installed on the CCC interface, installing the lookup table entry within the lookup table at the non-software-defined network.

8. The method of claim 1, further comprising:

receiving, at the switching device, at least one additional packet via the non-software-defined network;

searching the lookup table installed on the CCC interface for a lookup table entry that corresponds to the additional packet;

determining, based at least in part on the search, that the additional packet is destined for the software-defined network; and forwarding the additional packet to the software-defined network via the logical tunnel.

9. The method of claim 1, further comprising:

receiving, at the switching device, at least one additional packet via the software-defined network;

searching the set of flow entries that collectively direct network traffic incoming from the CCC interface for an additional flow entry that corresponds to the additional packet;

determining, based at least in part on the search, that the additional packet is destined for an additional non-software-defined network; and forwarding the additional packet to the additional non-software-defined network via an additional logical tunnel that interfaces the software-defined network with the additional non-software-defined network by connecting a virtual port within the software-defined network to a virtual port within the additional non-software-defined network.

10. The method of claim 1, wherein creating the logical tunnel comprises creating the Layer 2 interface within the software-defined network and the CCC interface within the non-software-defined network such that network traffic entering one of these Layer 2 and CCC interfaces exits the other one of these Layer 2 and CCC interfaces.

11. A system for interfacing software-defined networks with non-software-defined networks, the system comprising:

a connection module, stored in memory, that creates, at a switching device, a logical tunnel that interfaces a software-defined network with a non-software-defined network by connecting a Layer 2 interface of the switching device within the software-defined network to a Circuit Cross-Connect (CCC) interface of the switching device within the non-software-defined network, the logical tunnel being defined such that:

all network traffic that ingresses into the Layer 2 interface within the software-defined network egresses out of the CCC interface within the non-software-defined network;

all network traffic that ingresses into the CCC interface within the non-software-defined network egresses out of the Layer 2 interface within the software-defined network;

a remote controller of the software-defined network is able to control which Layer 2 interface handles network traffic incoming from the non-software-defined network by installing, on the Layer 2 interface, a set of flow entries that collectively direct network traffic incoming from the CCC interface;

the remote controller of the software-defined network is able to direct network traffic from the software-defined network to the non-software-defined network without being aware of the non-software-defined network's identity or communication protocol by relying on a lookup table installed on the CCC interface for routing network traffic within the non-software-defined network;

a receiving module, stored in memory, that receives at least one packet at the switching device via the software-defined network;

a searching module, stored in memory, that searches the set of flow entries that collectively direct network traffic within the software-defined network for a flow entry that corresponds to the packet;

a determination module, stored in memory, that determines that the packet is destined for the non-software-defined network based at least in part on the search;

a forwarding module, stored in memory, that forwards the packet to the non-software-defined network via the logical tunnel that interfaces the software-defined network with the non-software-defined network by directing the packet to the Layer 2 interface within the software-defined network such that the packet egresses out of the CCC interface within the non-software-defined network; and at least one physical processor that executes the connection module, the receiving module, the searching module, the determination module, and the forwarding module.

12. The system of claim 11, wherein the forwarding module forwards the packet to the non-software-defined network via the logical tunnel by routing the packet to the Layer 2 interface within the software-defined network such that the packet exits the CCC interface within the non-software-defined network.

13. The system of claim 11, further comprising an update module that updates the set of flow entries that collectively direct network traffic within the software-defined network by adding the flow entry to the set of flow entries prior to searching the set of flow entries.

14. The system of claim 11, wherein the flow entry directs corresponding network traffic to the Layer 2 interface within the software-defined network to facilitate passing the corresponding network traffic to the CCC interface within the non-software-defined network via the logical tunnel.

15. The system of claim 11, wherein:
the receiving module receives, at the non-software-defined network, the packet via the logical tunnel;
the searching module searches the lookup table installed on the CCC interface for a lookup table entry that corresponds to the packet;
the determination module determines, based at least in part on the search, that the packet is destined for a computing device within the non-software-defined network; and
the forwarding module forwards the packet to the computing device within the software-defined network.

16. The system of claim 15, further comprising an installation module that installs the lookup table entry within the lookup table installed on the CCC interface prior to searching the lookup table at the non-software-defined network.

17. The system of claim 11, further comprising:
the receiving module receives, at the switching device, at least one additional packet via the non-software-defined network;
the searching module searches the lookup table installed on the CCC interface for a lookup table entry that corresponds to the additional packet;
the determination module determines, based at least in part on the search, that the additional packet is destined for the software-defined network; and
the forwarding module forwards the additional packet to the software-defined network via the logical tunnel.

18. The system of claim 11, further comprising:
the receiving module receives, at the switching device, at least one additional packet via the software-defined network;
the searching module searches the set of flow entries that collectively direct network traffic incoming from the CCC interface for an additional flow entry that corresponds to the additional packet;

the determination module determines, based at least in part on the search, that the additional packet is destined for an additional non-software-defined network; and
the forwarding module forwards the additional packet to the additional non-software-defined network via an additional logical tunnel that interfaces the software-defined network with the additional non-software-defined network by connecting a virtual port within the software-defined network to a virtual port within the additional non-software-defined network.

19. The system of claim 11, wherein the connection module creates the Layer 2 interface within the software-defined network and the CCC interface within the non-software-defined network such that network traffic entering one of these Layer 2 and CCC interfaces exits the other one of these Layer 2 and CCC interfaces.

20. A non-transitory computer-readable medium comprising one or more computer-executable instructions that, when executed by at least one processor of a computing device, cause the computing device to:
create, at a switching device, a logical tunnel that interfaces a software-defined network with a non-software-defined network by connecting a Layer 2 interface of the switching device within the software-defined network to a Circuit Cross-Connect (CCC) interface of the switching device within the non-software-defined network, the logical tunnel being defined such that:
all network traffic that ingresses into the Layer 2 interface within the software-defined network egresses out of the CCC interface within the non-software-defined network;
all network traffic that ingresses into the CCC interface within the non-software-defined network egresses out of the Layer 2 interface within the software-defined network;
a remote controller of the software-defined network is able to control which Layer 2 interface handles network traffic incoming from the non-software-defined network by installing, on the Layer 2 interface, a set of flow entries that collectively direct network traffic incoming from the CCC interface;
the remote controller of the software-defined network is able to direct network traffic from the software-defined network to the non-software-defined network without being aware of the non-software-defined network's identity or communication protocol by relying on a lookup table installed on the CCC interface for routing network traffic within the non-software-defined network;
receive, at the switching device, at least one packet via the software-defined network;
search the set of flow entries that collectively direct network traffic within the software-defined network for a flow entry that corresponds to the packet;
determine, based at least in part on the search, that the packet is destined for the non-software-defined network; and
forward the packet to the non-software-defined network via the logical tunnel that interfaces the software-defined network with the non-software-defined network by directing the packet to the Layer 2 interface within the software-defined network such that the packet egresses out of the CCC interface within the non-software-defined network.

* * * * *